United States Patent

[11] 3,604,967

| [72] | Inventors | Gerd E. Krulls;<br>Earl R. Booser, both of Scotia, N.Y. |
|---|---|---|
| [21] | Appl. No. | 27,357 |
| [22] | Filed | Apr. 10, 1970 |
| [45] | Patented | Sept. 14, 1971 |
| [73] | Assignee | General Electric Company |

[54] LIQUID METAL COLLECTOR VELOCITY DIVIDER
3 Claims, 2 Drawing Figs.

[52] U.S. Cl. .............................................. 310/178, 310/243
[51] Int. Cl. .................................................. H02k 31/00
[50] Field of Search ........................................... 310/178, 219, 243

[56] References Cited
UNITED STATES PATENTS

| 1,635,319 | 7/1927 | Gill | 310/178 |
| 2,109,111 | 2/1938 | Gearhart | 310/219 |
| 3,133,216 | 5/1964 | Sayers | 310/178 |
| 3,444,408 | 5/1969 | Krulls | 310/178 |
| 3,453,467 | 7/1969 | Harvey | 310/178 |

Primary Examiner—Milton O. Hirshfield
Assistant Examiner—R. Skudy
Attorneys—William C. Crutcher, Bryan C. Ogden, Frank L. Neuhauser, Oscar B. Waddell and Joseph B. Forman ABSTRACT: Liquid metal collector is provided with a rotatable cup member and a stationary conductor blade. A floating ring is positioned generally intermediate between the blade and cup member and is immersed in the liquid metal such that is effectively reduces the rotational velocity of the liquid metal relative to the ring members by approximately one-half over the surface of the conductor blade. By so reducing the velocity of the liquid metal, power losses are reduced and antierosion characteristics are improved. A plurality of floating rings may be employed which will reduce the relative velocities even more.

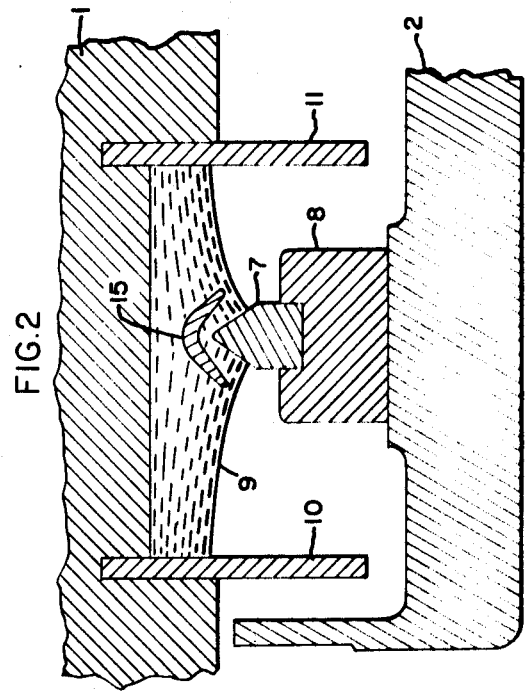
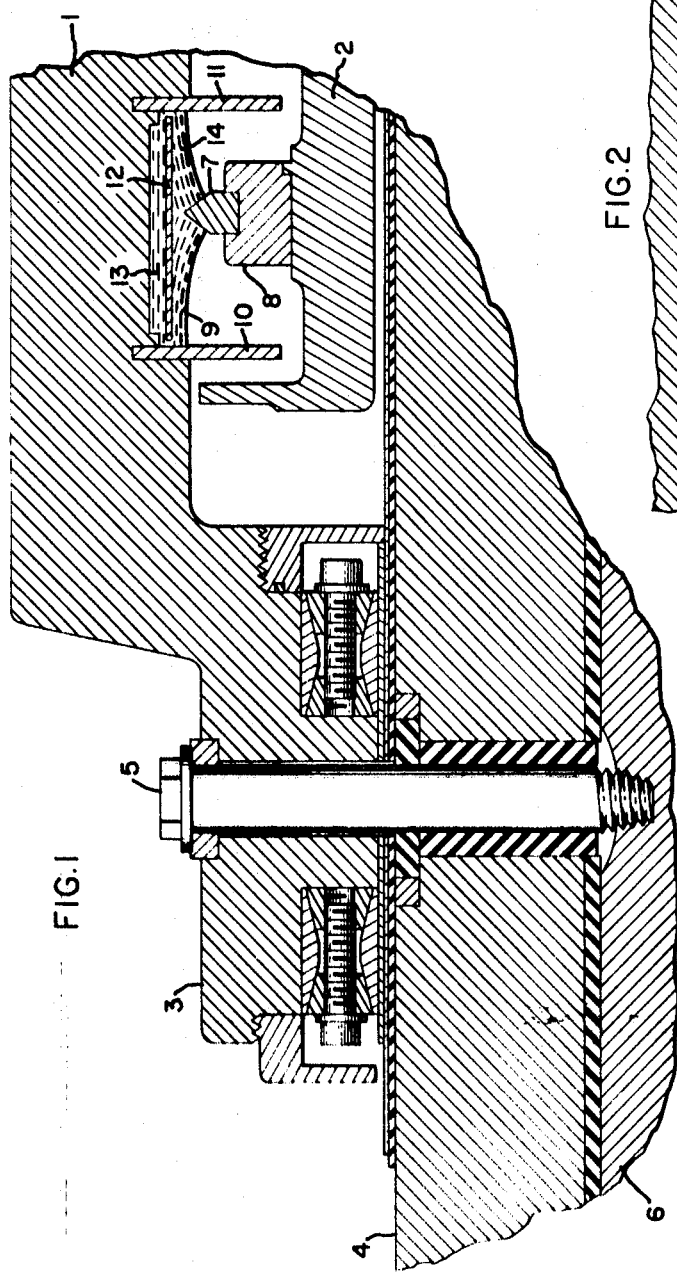
INVENTORS:
GERD E. KRULLS,
EARL R. BOOSER,
BY *Bryan C. Ogden*
THEIR ATTORNEY.

3,604,967

LIQUID METAL COLLECTOR VELOCITY DIVIDER

BACKGROUND OF THE INVENTION

This invention relates generally to liquid metal collectors which are used in large dynamoelectric machines and more particularly, to an improved collector which has enhanced electrical conducting capabilities. Specifically, the invention relates to a device whereby the rotating velocity of the liquid metal is reduced in the proximity of the conductor blade, thereby enhancing the conducting characteristics between the liquid metal and blade.

As the ratings of large dynamoelectric machines increase, usually, so too does the requirement for field current in a large machine having a rotating field. In the past, in order to transmit the field current to the rotating member, the use of carbon brushes had usually been sufficient. However, with today's high field currents, it has been found that a liquid metal collector, normally employing liquid mercury as the conductive fluid, offers much greater current carrying capacity as compared to carbon brushes.

In liquid metal collectors of the variety where the conductive liquid metal rotates relative to a stationary conductor blade, there are two primary problems which present themselves. The first problem which has been associated with the prior art is that of erosion of the stationary element. Since mercury is a dense material and since the stationary element is usually constructed of stainless steel, there will be an erosion process resulting from the flow of mercury over any discontinuities which are present in the stationary element, such as liquid metal feed holes or pressure sensing holes. Of course, the erosion could be eliminated by removing any discontinuities on the stationary element, but this would be at the expense of the feed hole and pressure hole, both of which are necessary to control the operating level of the liquid metal in the rotating cup area. Another solution is to reduce the velocity of the liquid metal as it flows over the surface of the stationary conductor element, thereby lessening the impact of the liquid metal at any discontinuities.

The other problem associated with the rotating liquid metal is that there is a certain fluid friction power loss which depends directly on the cube of the rotating cup speed. This may be expressed in equation form as: $P=K\omega^3$ (power loss equals a system constant times cup speed cubed). It will be appreciated from this expression that as the effective cup speed and therefore the liquid metal speed is reduced, the power loss will decrease as that fraction of the decrease cubed. Of course it is desirable to have the power loss as small as possible to minimize heating and thus allow passage of larger electrical currents.

Accordingly, one object of the present invention is to reduce the erosion caused by the rotating liquid metal at any discontinuities on the stationary conductor element.

Another primary object is to reduce the power loss from fluid friction which depends directly on the cube of the rotating cup speed.

SUMMARY OF THE INVENTION

Briefly stated, this invention is practiced in one form by positioning a circumferential ring in the body of conductive liquid metal and intermediate between the rotating cup and the conductor blade. By utilizing such a single intermediate ring which will float in the liquid metal and rotate at one-half the cup speed, the velocity of the liquid metal will be halved over the surface of the conductor blade as compared to the velocity of the liquid metal immediately adjacent the rotating cup. The circumferential ring is dynamically stable and self-centering so that the velocity gradient over the surface of the conductor blade is generally even.

BRIEF DESCRIPTION OF THE DRAWING

FIG. 1 is a partial view in section of the liquid metal collector showing the present invention in its operating environment.

FIG. 2 is an enlarged view in section showing an alternate embodiment of the present invention.

DESCRIPTION OF THE PREFERRED EMBODIMENT

Referring now to FIG. 1, the general environment of the present invention will be described. The liquid metal collector is generally comprised of a conductive rotatable cup member indicated as 1 and the annular stationary member generally indicated as 2. The rotatable cup member 1 is securely joined at its base portion 3 to the rotatable shaft 4 of the dynamoelectric machine. Conductive stud bolts 5 connect the base portion 3 of the conductive cup member 1 to the field conductor bars 6 which extend axially through the center portion of the shaft 4. The stud bolts 5 are electrically insulated from the rotatable shaft 4 so that the field current will be properly directed to the field conductor bars 6.

Positioned about the circumference of the stationary member 2 is the annular conductor blade 7 and its associated mounting member 8. The conductor blade 7 is positioned along the annular stationary member 2 such that it is axially within the liquid metal cup area indicated as 9. The liquid metal during operation is contained within the cup area 9 by the circumferential sidewalls 10, 11 which extend radially inward from the rotatable cup member 1.

The flow of the field current is generally as follows:

Through the stationary member 2, into the mounting member 8, through the conductor blade 7, through the annular volume of rotating liquid metal which is contained within the cup area 9, into the rotatable cup member 1, and thence through the stud bolts 5 to the field conductor bars 6.

Turning now to a description of the improvement, an axially extending circumferential ring 12 is positioned in the liquid metal cup area 9 and generally divides the rotating liquid metal into an outer rotating volume 13 and an inner rotating volume 14. The floating ring 12 is dynamically stable and self-centering in that when the cup member 1 is up to speed, the floating ring will position itself in the proper relationship and will rotate at generally one-half the speed of cup member 1 (in a 3,600 r.p.m. machine, the ring 12 would rotate at approximately 1,800 r.p.m.) In this manner, the outer rotating volume 13 of liquid metal will rotate at a speed intermediate between the speed of rotatable cup member 1 and the speed of floating ring 12, while the inner volume 14 of liquid metal will rotate at approximately one-half of the speed of outer volume 13. This is because the frictional fluid drive on the outer surface of ring 12 tending to rotate it is opposed by frictional drag on its inner surface tending to slow it down.

It will thus be appreciated that the inner volume 14 of liquid metal flowing over the surface of the conductor blade 7 is moving substantially slower compared to a liquid metal cup area without the floating circumferential ring 12 and this will reduce the amount of erosion by a significant amount. It is contemplated that as the field current leaves the conductor blade 7, it will flow around the floating circumferential ring 12, thereby preventing any additional voltage drop and associated electrical loss, although this is not a necessary feature of the present invention, since the ring 12 can be either conductive or nonconductive.

By providing that the inner volume 14 of the liquid metal will flow at approximately half the speed compared to the liquid metal speed with no floating ring, the power losses may be reduced in the following manner. With the floating circumferential ring 12 in place, the applicable representation of the power loss is: $P=2K(\frac{1}{2}\omega)^3=\frac{1}{4}K\omega^3$; where $K$ as previously mentioned is a system constant, $\omega$ is cup speed and $P$ is power loss. This it will be appreciated that without the floating ring where the power loss was represented by $K\omega^3$, the power loss is theoretically four times greater compared to the liquid metal collector which utilizes a single floating circumferential ring.

It is contemplated within the purview of the present invention to provide more than one floating ring. By providing additional radially spaced floating rings, for example, two, positioned so as to rotate and reduce the relative speed of the liquid metal over the surface of the conductor blade 7, the liquid metal velocity is effectively one-fourth of the rotating cup speed. The power loss would be reduced accordingly as would the erosion of the conductor blade material by the additional reduction in velocity. Again, each of the floating rings would be dynamically stable and selfcentering, and arranged such that the field current would still flow around the rings through the rotating liquid metal to the conductive cup member 1.

A modification of the present invention shown in FIG. 2 is comprised of a single curved floating circumferential ring 15. This variation performs much the same as the embodiment in FIG. 1 except for the curvilinear nature of the floating ring 15. The floating ring 15 has a cup-shaped cross section such that it generally conforms to the outline of the conductor blade 7 so that the likelihood of the floating ring 15 centering itself as the rotatable cup is brought up to speed will be substantially increased. When the liquid metal collector is at rest, the curved floating ring 15 will rest on the periphery of the conductor blade 7 which serves to naturally position the ring during startup.

Thus it will be appreciated that a liquid metal collector has herein been described with improved anti-erosion and power loss characteristics. The improved characteristics are provided by a floating ring which will reduce the rotational velocity of the liquid metal over the surface of the conductor blade.

It may occur to others of ordinary skill in the art to make modifications of this invention which will remain within the concept and scope thereof and will not constitute a departure therefrom. Accordingly, it is intended that the invention be not limited by the details in which it has been described, but that it encompass all within the purview of the following claims.

What is claimed is:

1. In a conductive liquid collector for use in a dynamoelectric machine having a stationary conductor blade immersed in a rotating volume of conductive liquid contained within a rotating cup member, the improvement comprising:
   at least one floating ring member positioned between the conductor blade and the cup member so constructed and arranged that when the cup member is up to speed, the ring member floats freely in the conductive liquid substantially reducing the velocity of said conductive liquid over the surface of the blade.

2. A conductive liquid collector according to claim 1 wherein the floating ring member has a cup-shaped cross section conforming generally to the outline of the blade surface.

3. A conductive liquid collector according to claim 1 wherein the floating ring member is out of contact with the cup member and the stationary blade so that an uninterrupted current path is provided through the liquid metal around the ring member.